(12) United States Patent
Noguchi et al.

(10) Patent No.: US 7,306,258 B2
(45) Date of Patent: Dec. 11, 2007

(54) GUIDE UNIT FOR GUIDING CURTAIN AIRBAG AND CURTAIN AIRBAG DEVICE

(75) Inventors: Atsushi Noguchi, Moriyama (JP); Tetsu Mitsuo, Toyota (JP)

(73) Assignee: Takata Corporation, Tokyo (JP)

( * ) Notice: Subject to any disclaimer, the term of this patent is extended or adjusted under 35 U.S.C. 154(b) by 408 days.

(21) Appl. No.: 11/015,026

(22) Filed: Dec. 20, 2004

(65) Prior Publication Data
US 2005/0140124 A1 Jun. 30, 2005

(30) Foreign Application Priority Data
Dec. 22, 2003 (JP) ............................ 2003-425159

(51) Int. Cl.
*B60R 21/20* (2006.01)
*B60R 21/16* (2006.01)
(52) U.S. Cl. ................................ 280/730.2; 280/743.2
(58) Field of Classification Search ............. 280/730.2, 280/743.2
See application file for complete search history.

(56) References Cited
U.S. PATENT DOCUMENTS
6,237,938 B1 5/2001 Boxey
6,783,152 B2 8/2004 Tanase et al.
6,866,293 B2 3/2005 Ogata
6,902,188 B2 * 6/2005 Nakamura et al. ........ 280/730.2
2003/0052478 A1 * 3/2003 Peer et al. ................ 280/730.2
2003/0080541 A1 5/2003 Kalandek et al.

FOREIGN PATENT DOCUMENTS
JP 2003-54351 A 2/2003
JP 2004-67045 A 3/2004

* cited by examiner

*Primary Examiner*—Ruth Ilan
(74) *Attorney, Agent, or Firm*—Foley & Lardner LLP

(57) ABSTRACT

A curtain airbag device and a guide unit achieve a quick and smooth deployment of a curtain airbag. When an inflator is activated, a curtain airbag is deployed downward along an inner side surface of a pillar garnish facing the interior of a vehicle cabin. During the deployment, the rear portion of the curtain airbag is guided by a guide rod via a link strap and a ring. Before the airbag is deployed, the ring is supported by an upper portion of the guide rod by a holder. When the airbag is deployed and link strap begins to move downward, the ring is released from the holder and moves along the guide rod.

10 Claims, 4 Drawing Sheets

GUIDE UNIT FOR GUIDING CURTAIN AIRBAG AND CURTAIN AIRBAG DEVICE

BACKGROUND

The present invention relates to guide units for guiding curtain airbags deployed along inner side surfaces of vehicle cabins. More particularly, the invention relates to a guide unit provided with a guide rod and a link strap protruding from a curtain airbag. Furthermore, the present invention relates to a curtain airbag device provided with such a guide unit.

In a vehicle provided with a curtain airbag device, when the vehicle is involved in, for example, a side-on collision or rollover, curtain airbags are deployed downward along an inner side surface (for example, a door and a pillar) of the vehicle cabin so as to protect the head of the vehicle occupant and to keep the vehicle occupant inside the vehicle cabin.

U.S. Pat. No. 6,237,938 discloses an example in which guide elements are provided on a C pillar for guiding downward (along the pillar) a rear portion of a curtain airbag, which is inflatable along the inner side surface of the vehicle cabin. Moreover, the guide elements in U.S. Pat. No. 6,237,938 (incorporated by reference herein) include a track having a box-shaped cross-section and a slider (also referred to as an "element") that is movably arranged in the track in the longitudinal direction of the track. The rear end portion of the curtain airbag is tied to the slider. To prevent the rear edge portion of the curtain airbag, which is moved downward, from being retracted upward, latches are arranged at regular intervals along substantially the entire length of the track. The top and bottom ends of the track are provided with mounting flanges; each of the flanges is fixed to the C pillar with a bolt or a screw. Unfortunately, as a result of the structures provided in U.S. Pat. No. 6,237,938, when the curtain airbag is inflated, the inflation is neither quick nor smooth.

Accordingly, the present invention has been made in light of the aforementioned problems. More specifically, an object of the present invention is to provide a guide unit for a curtain airbag (and a curtain airbag device provided with such a guide unit) whereby when the curtain airbag is deployed, the curtain airbag is deployed quickly and smoothly.

SUMMARY

According to an embodiment of the present invention, a guide unit is provided. The guide unit includes, among other possible things: (a) a guide rod attached to a pillar of a vehicle, wherein the guide rod extends in a vertical direction and is configured to guide an end of a curtain airbag being deployed downward along an inner side surface of a vehicle cabin; and (b) a link strap protruding from the curtain airbag and engaged with the guide rod, wherein an end of the link strap is provided with a ring. An upper portion of the guide rod is provided with a holder for supporting the ring.

In a further embodiment of this guide unit, the holder may support the ring in a manner such that the ring is not in contact with the guide rod before the airbag is deployed.

In another further embodiment of this guide unit, the holder may include a deformable segment that is configured to be deformed toward the center of the guide rod. Further, the ring may be supported by the deformable segment and may be configured to be released from the deformable segment when a downward force, which pulls the ring, exceeds a predetermined value and deforms the deformable segment.

In another further embodiment of this guide unit, the guide rod and the ring may be metallic. Further, at least a section of the holder in contact with the ring may be formed of synthetic resin or rubber.

Another embodiment of the invention addresses a curtain airbag device that includes, among other possible things: (a) a curtain airbag that is configured to be deployed downward along an inner side surface of a vehicle cabin; and (b) a guide unit of the type previously described for guiding an end of the curtain airbag.

Another embodiment of the invention addresses a vehicle that includes among other possible things: (a) a vehicle cabin having a roof side and an inner side surface; and (b) a curtain airbag device installed along the roof side of the vehicle cabin. The curtain airbag device includes among other possible things: (i) a curtain airbag that is configured to be deployed downward along the inner side surface of the vehicle cabin; and (ii) a guide unit for guiding an end of the curtain airbag when the airbag is deployed. The guide unit includes, among other possible things: (A) a guide rod attached to a pillar of the vehicle, wherein the guide rod extends in a vertical direction and is configured to guide the end of a curtain airbag downward along the inner side surface of the vehicle cabin, when the airbag is deployed; (B) a link strap protruding from the curtain airbag and engaged with the guide rod, wherein an end of the link strap is provided with a ring; and (C) a holder for supporting the ring, wherein an upper portion of the guide rod is received in the holder.

In a further embodiment of this vehicle, the holder may support the ring in a manner such that the ring is not in contact with the guide rod before the airbag is deployed.

In another further embodiment of this vehicle, the holder may include a deformable segment that is configured to be deformed toward the center of the guide rod. Further, the ring may be supported by the deformable segment and may be configured to be released from the deformable segment when a downward force, which pulls the ring, exceeds a predetermined value and deforms the deformable segment.

In another further embodiment of this vehicle, the guide rod and the ring may be metallic. Further, at least a section of the holder in contact with the ring may be formed of synthetic resin or rubber.

Another embodiment of the invention addresses a guide unit for guiding an end of a curtain airbag when the airbag is deployed. This guide unit includes, among other possible things: (a) a guide rod attached to a pillar of a vehicle, wherein the guide rod extends in a vertical direction and is configured to guide the end of a curtain airbag downward along the inner side surface of a vehicle cabin, when the airbag is deployed; (b) a link strap protruding from the curtain airbag and engaged with the guide rod, wherein an end of the link strap is provided with a ring; and (c) a holder for releaseably supporting the ring, wherein an upper portion of the guide rod is received in the holder.

In a further embodiment of this guide unit, the holder may support the ring in a manner such that the ring is not in contact with the guide rod before the airbag is deployed.

In another further embodiment of this guide unit, the holder may include a deformable segment that is configured to be deformed toward the center of the guide rod. Further, the ring may be supported by the deformable segment and may be configured to be released from the deformable segment when a downward force, which pulls the ring, exceeds a predetermined value and deforms the deformable segment.

In another further embodiment of this guide unit, the guide rod and the ring may be metallic. Further, at least a section of the holder in contact with the ring may be formed of synthetic resin or rubber.

Many advantages are provided by the above-described embodiments. For example, as the holder may support the ring in a manner such that the ring is not in contact with the guide rod, the ring and the guide rod are prevented from creating a noise even when, for example, the vehicle vibrates. In addition, by providing the metallic ring and metallic guide rod, the strength of the ring and the guide rod is sufficiently increased and, therefore, the sliding friction between the two is reduced by a great amount, thereby allowing the ring to move smoothly along the guide rod. Moreover, as the ring on one end of the link strap moves smoothly downward along the guide rod when the curtain airbag is deployed, the curtain airbag can be deployed very quickly.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described as follows:

FIGS. 3A-3C illustrate a curtain airbag device and the guide unit of FIG. 1 in which: FIG. 3A is a schematic view illustrating the curtain airbag extending along a roof side of a vehicle and the guide rod being disposed along a C pillar; FIG. 3B is a schematic view illustrating an enlarged view of an area (indicated by an arrow B) in FIG. 3A; and FIG. 3C is a schematic view illustrating a state in which a pillar garnish is added to the embodiment shown in FIG. 3B;

FIGS. 5A-5B illustrate the curtain airbag of FIGS. 3A-3C in the process of being deployed in which: FIG. 5A is a perspective view; and FIG. 5B is a cross-sectional view taken along line B-B in FIG. 5A.

DETAILED DESCRIPTION

Figure 3A:
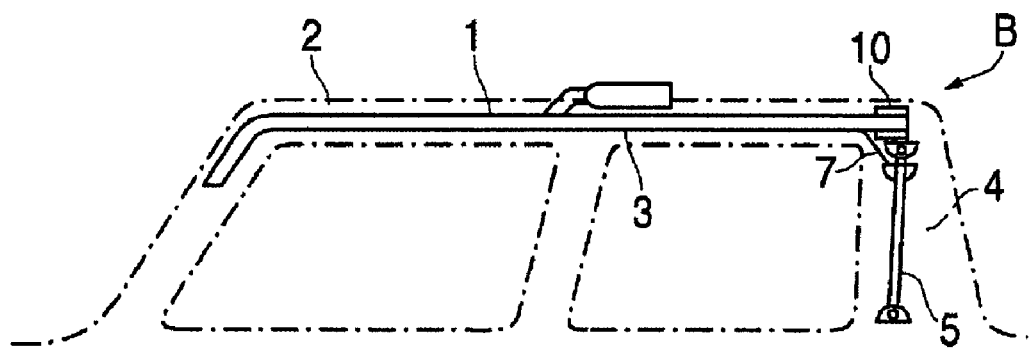
Figure 3B:
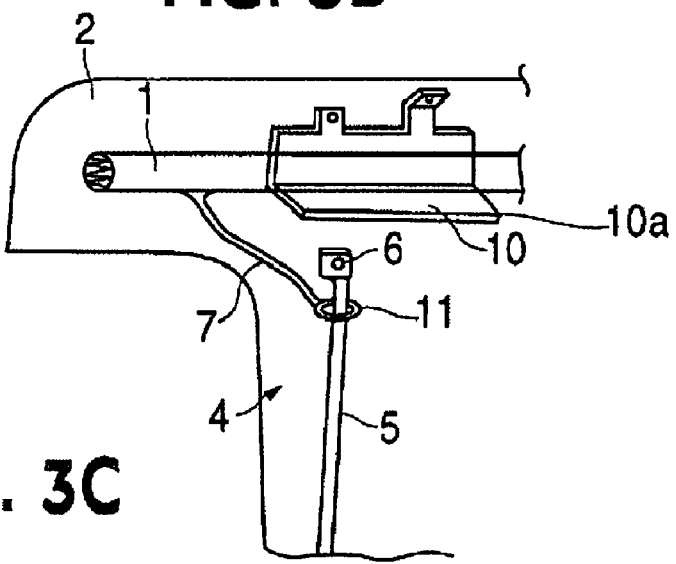

The present invention will now be described with reference to the drawings, with respect to which a holder 20 is not shown in FIGS. 3-5 and a pillar garnish 8 is not shown in FIGS. 3A and 3B.

Figure 3C:
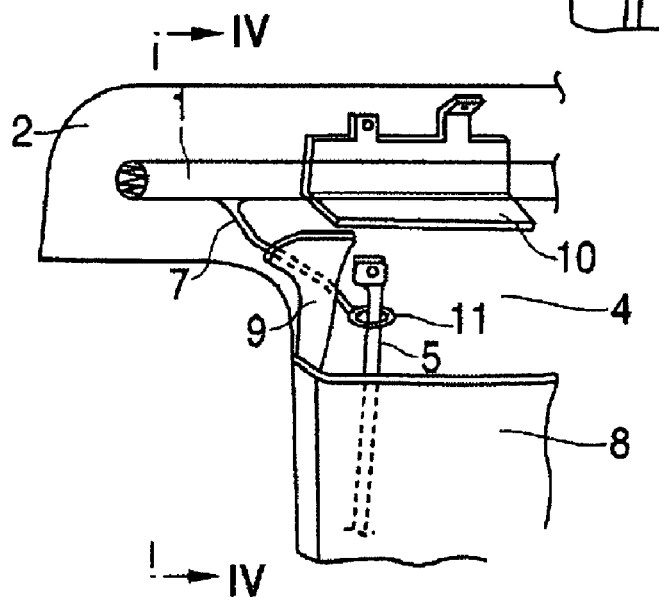
Figure 4:
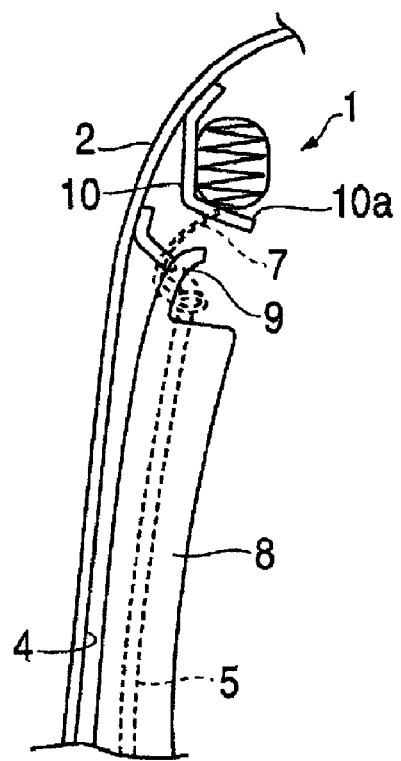
FIG. 4 is a cross-sectional view taken along line IV-IV in FIG. 3C.
Figure 5A:
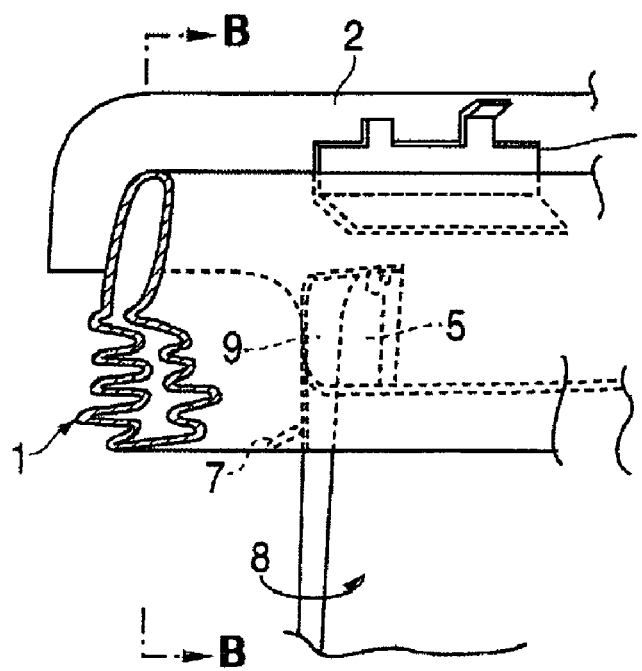
Figure 5B:
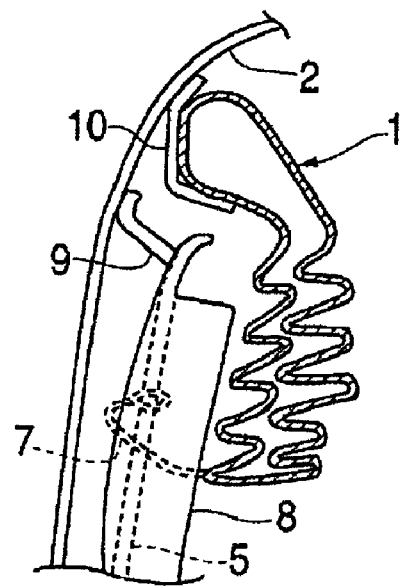

With respect to FIGS. 3-4, according to an embodiment, a pair of curtain airbags 1 (one of which is shown) is disposed along roof sides 2 (one of which is shown) of a vehicle (i.e., border sections between the ceiling and inner side surfaces of a vehicle cabin). The airbags 1 are folded in a slender manner in the longitudinal direction of the vehicle. When a vehicle is involved in a side-on collision or a rollover, for example, each curtain airbag 1 is inflated as a result of gas being sent from an inflator 3. The curtain airbag 1 is deployed in the downward direction of the vehicle body along the corresponding side surface, i.e. doors and pillars, in the vehicle cabin. An upper edge of each curtain airbag 1 is provided with tabs (not shown) that are fastened to the corresponding roof side 2.

Each C pillar 4 in a vehicle has a metallic guide rod 5 attached thereto. The guide rod 5 guides the rear portion of the corresponding curtain airbag 1 along the C pillar 4 (i.e., in the downward direction of the vehicle body) when the curtain airbag 1 is deployed. The guide rod 5 has a rod-like structure that extends along the C pillar 4 in the vertical direction of the vehicle body. Both the upper and lower ends of the guide rod 5 are fixed to the C pillar 4 with, for example, bolts 6.

Figure 1:
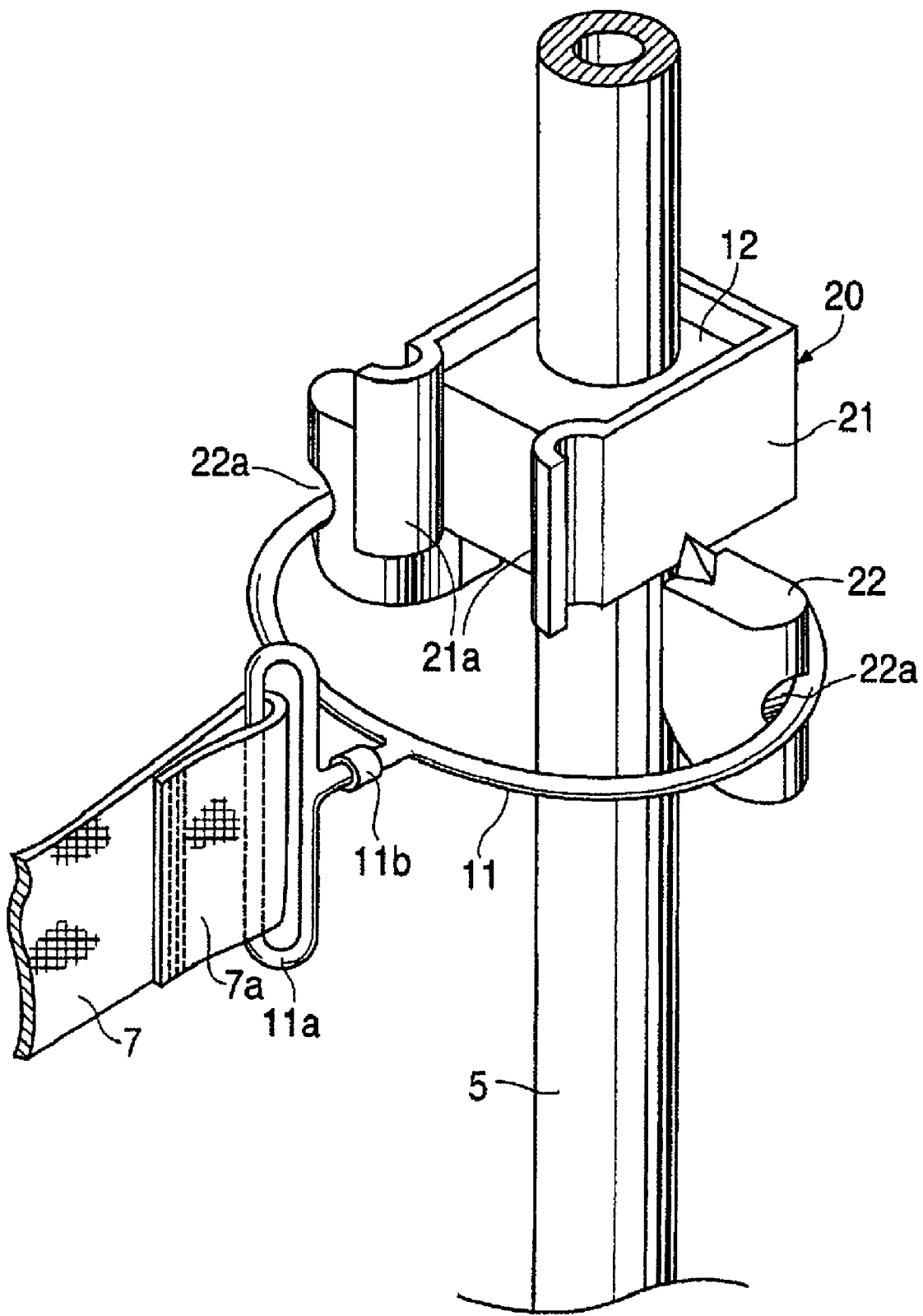
FIG. 1 is a perspective view illustrating an upper portion of a guide rod of a guide unit according to an embodiment of the present invention.
Figure 2:
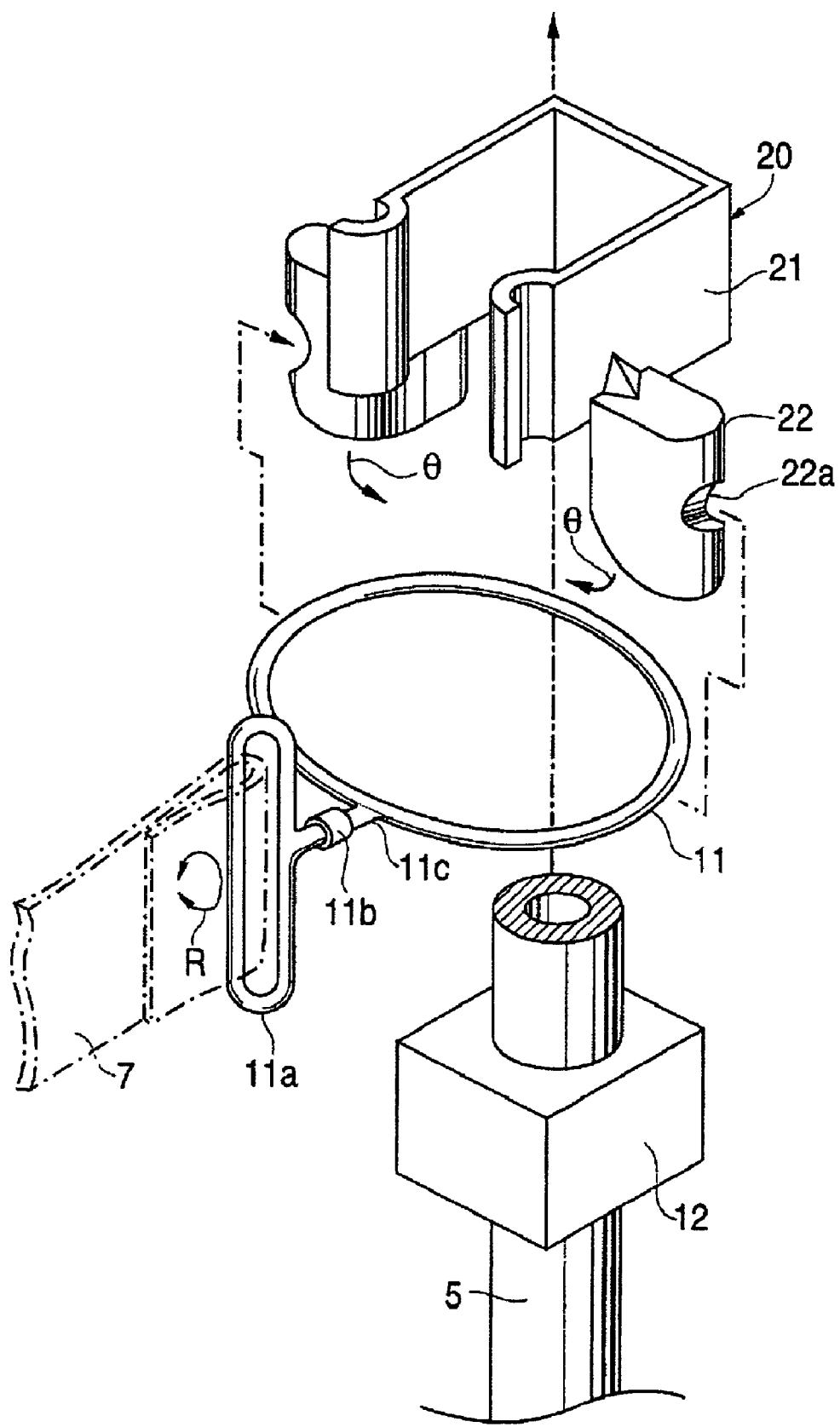
FIG. 2 is an exploded view of the embodiment shown in FIG. 1.

The bottom corner area in the rear portion of each curtain airbag 1 has a base end of a link strap 7 attached thereto. On the other hand, a front end of the link strap 7 is provided with a metallic ring 11 having a substantially oval shape. The ring 11 is fitted around the guide rod 5. As shown in FIGS. 1 and 2, the ring 111 has a strap loop 11a having a long oval shape. The link strap 7 is inserted through and held by the strap loop 11a so as to be connected to the ring 11. Reference numeral 7a in FIG. 1 indicates a stitched portion of the link strap 7.

According to an embodiment, the strap loop 11a is connected with a connection shaft 11c via an adjustable joint 11b. Accordingly, as indicated by an arrow R in FIG. 2, the strap loop 11a is rotatable with respect to the connection shaft 11c. The connection shaft 11c projects outward from the ring 11.

A pillar garnish 8 (shown in FIG. 3C) covers the cabin-side of the C pillar 4. The door-frame portion of the C pillar 4 has a weather strip (not shown) attached thereto. An edge of the pillar garnish 8 is in contact with the weather strip.

A guide member 9 protrudes upward from the front edge of the top end of the pillar garnish 8. Moreover, the side edge of the pillar garnish 8 is linearly connected to the side edge of the guide member 9. The guide member 9 serves to guide the link strap 7 into the space between the side edge of the pillar garnish 8 and the weather strip at the early stage of the deployment of the curtain airbag 1. As shown in FIG. 3C, the link strap 7 is disposed between the guide member 9 and the C pillar 4 before the curtain airbag 1 is deployed.

Although not shown in FIGS. 1-5, the roof side 2 is provided with a roof-side garnish that also covers the curtain airbag 1. This roof-side garnish abuts on the pillar garnish 8 and covers the guide member 9. A curtain-guide member 10, also known as a jump base, is disposed on each roof side 2 above the C pillar 4. When the curtain airbag 1 is to be deployed, the curtain-guide member 10 allows the curtain airbag 1 to pass over the top of the pillar garnish 8 so as to guide the curtain airbag 1 towards the interior of the vehicle cabin. As shown in FIG. 4, the bottom portion 10a of the curtain-guide member 10 protrudes downslope from the roof side 2 towards the interior of the vehicle cabin.

With respect to FIGS. 1 and 2, a holder 20 is attached to the upper portion of the guide rod 5; the ring 11 is supported by the holder 20. The holder 20, which may be formed entirely of synthetic resin, is engaged with a box-shaped (in cross-section) holder attachment component 12 disposed at the upper portion of the guide rod 5. The holder attachment component 12, which may be formed of, for example, metal or synthetic resin, is fixed to the guide rod 5 with, for example, a screw. If the holder attachment component 12 is metallic, the holder attachment component 12 may alternatively be integrated with the guide rod 5 by, for example, welding or press-molding. As a further alternative, the upper portion of the guide rod 5 may be provided with a recessed or projected engagement section; the holder attachment component 12 may be fixed to the guide rod 5 by engaging the component 12 with such an engagement section.

The holder 20 is fitted around the holder attachment component 12 and includes: (a) a substantially U-shaped (in cross-section) holder base 21 having ends that terminate in semi-cylindrically curved portions 21a each of which engages with one of the edges of the holder attachment component 12; (b) a pair of projected segments 22 projecting from the holder base 21; and (c) depressed portions 22a each provided on the outer surface of the corresponding projected segment 22. The projected segments 22 project from the holder base 21 in opposite directions from each other, and also project downward from the holder base 21. The depressed portions 22a, which are provided on the outer surface of the corresponding projected segment 22, have a curved surface whose cross-section is substantially arc-shaped.

If necessary, the holder base 21 may be mounted to the holder attachment component 12 with, for example, screws. As the holder base 21 is substantially U-shaped and the holder attachment component 12 is box-shaped, the holder 20 is prevented from rotating around the holder attachment component 12.

The projected segments 22 are elastically deformable so as to be moved towards each other in directions indicated by arrows θ in FIG. 2, with respect to the connected sections between the projected segments 22 and the holder base 21. The ring 11 is disposed around the projected segments 22 and is engaged with the depressed portions 22a. FIG. 1 illustrates the state in which the ring 11 is engaged with the depressed portions 22a. In this state, the ring 11 is tightly in contact with the projected segments 22 and, therefore, lightly presses the projected segments 22 towards each other. Consequently, even if vibrations are transmitted to the ring 11 from the vehicle body, the ring 11 is stably supported by the holder 20. Moreover, as the ring 11 is not directly in contact with the guide rod 5, the ring 11 and the guide rod 5 are inhibited from creating noise even when the vehicle body vibrates.

As the curtain airbag 1 is deployed, the ring 11 is pulled downwards with great force via the link strap 7. Thus, the ring 11 becomes disengaged from the depressed portions 22a and is released from the projected segments 22. The ring 11 is then shifted away from the holder 20 and moves downward along the guide rod 5. As both the ring 11 and the guide rod 5 are metallic, the sliding friction between the ring 11 and the guide rod 5 is extremely low, thereby enabling the ring 11 is slide quickly and smoothly.

When a vehicle provided with such a curtain airbag device is involved in a side-on collision or a rollover, the inflator 3 generates gas so as to inflate the curtain airbag 1. The curtain airbag 1 pushes open the roof-side garnish. The curtain-guide member 10 allows the curtain airbag 1 to pass over the top end of the pillar garnish 8 so as to guide the curtain airbag 1 towards the interior of the vehicle cabin. Subsequently, the curtain airbag 1 begins to deploy downward along the cabin-side of the pillar garnish 8. As previously discussed, as the curtain airbag 1 is deployed, the ring 11 provided at the tip of the link strap 7 is pulled downward with great force so that the ring 11 is released from the holder 20 and thereafter moves downward along the guide rod 5.

The rear portion of the deploying curtain airbag 1 is guided by the guide rod 5 via the link strap 7 and the ring 11. The link strap 7 starts moving downward along the guide rod 5 when the curtain airbag 1 begins to be deployed. At this moment, the link strap 7 is quickly and smoothly guided into the space between the pillar garnish 8 and the weather strip by the guide member 9. The link strap 7 moves downward while ripping through the pillar garnish 8 and the weather strip during the deployment of the curtain airbag 1.

The ring 11 and the link strap 7 move downward along the guide rod 5 with the airbag 1 until the curtain airbag 1 reaches the bottommost point of deployment. As the link strap 7 connects the curtain airbag 1 and the guide rod 5, the curtain airbag 1 can be deployed along the side surface of the vehicle cabin. In addition, as the ring 11 and the guide rod 5 are metallic, there is hardly any sliding friction between the ring 11 and the guide rod 5 so that the ring 11 moves smoothly along the guide rod 5. Moreover, as a result of this smooth movement, the curtain airbag 1 can be extremely rapidly deployed. Further, as the guide member 9 is disposed on the pillar garnish 8, an alignment between the guide member 9 and the pillar garnish 8 is not required and, therefore, the time required to assemble a separate guide member 9 can be saved.

Alternatively, the guide member may be disposed on the roof side 2. As a further alternative, the guide member may be integrally disposed on the guide rod 5, may be integrally disposed on the curtain-guide member 10, or may be attached to the pillar garnish 8.

By way of another alternative, the guide member may be composed of a first guide plate adjacent to the vehicle body and a second guide plate adjacent to the interior of the vehicle cabin; a link strap may be disposed between the guide plates. This alternative structure prevents the link strap from interfering with the assembly process when a weather strip, for example, is being mounted to the vehicle body.

The technical scope of the present invention is not limited to the above embodiment, and modifications are permissible within the scope and spirit of the present invention. For example, although the holder 20 in the above-described embodiment may be formed entirely of synthetic resin, the holder may partially be formed of synthetic resin such that only the sections in contact with the ring 11, namely, the projected segments 22, are formed of synthetic resin. Or, only the areas where the depressed portions 22a are disposed may be formed of synthetic resin. Furthermore, the inner surface of each depressed portion 22a may alternatively be provided with a rubber lining, and other parts of the holder 20 may be formed of metal or synthetic resin. Moreover, although each of the projected segments 22 in the above-described embodiment is elastically deformable in the θ direction due to its own elasticity, additional springs may alternatively be provided such that the projected segments 22 can be elastically deformed or moved by the springs. Finally, the guide rod and the link strap may alternatively be disposed in a manner such that the curtain airbag is guided along a B pillar or an A pillar.

The priority application, Japanese Application 2003-425159, which was filed Dec. 22, 2003, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure that are within the scope and spirit of the present invention are to be included as further embodiments of the present invention Moreover, the technical scope of the present invention is not limited to the embodiments described herein. Rather, modifications are permissible within the scope and spirit of the present invention. The scope of the present invention is to be defined as set forth in the following claims.

What is claimed is:

1. A guide unit for a curtain airbag comprising:
   a guide rod attached to a pillar of a vehicle, wherein the guide rod extends in a vertical direction and is configured to guide an end of a curtain airbag being deployed downward along an inner side surface of a vehicle cabin; and
   a link strap protruding from the curtain airbag and engaged with the guide rod, wherein an end of the link strap is provided with a ring,
   wherein an upper portion of the guide rod is provided with a holder for supporting the ring, and
   wherein the holder supports the ring in a manner such that the ring is not in contact with the guide rod before the airbag is deployed.

2. The guide unit for the curtain airbag according to claim 1, wherein the holder comprises a deformable segment that is configured to be deformed toward the center of the guide rod, and wherein the ring is supported by the deformable segment and is configured to be released from the deformable segment when a downward force, which pulls the ring, exceeds a predetermined value and deforms the deformable segment.

3. The guide unit for the curtain airbag according to claim 1, wherein the guide rod and the ring are metallic, and wherein at least a section of the holder in contact with the ring is formed of synthetic resin or rubber.

4. The vehicle according to claim 1, wherein the holder comprises a deformable segment that is configured to be deformed toward the center of the guide rod, and wherein the ring is supported by the deformable segment and is configured to be released from the deformable segment when a downward force, which pulls the ring, exceeds a predetermined value and deforms the deformable segment.

5. A curtain airbag device comprising:
   a curtain airbag that is configured to be deployed downward along an inner side surface of a vehicle cabin; and
   a guide unit according to claim 1 for guiding an end of the curtain airbag.

6. A guide unit for guiding an end of a curtain airbag when the airbag is deployed, the guide unit comprising:
   a guide rod attached to a pillar of a vehicle, wherein the guide rod extends in a vertical direction and is configured to guide the end of a curtain airbag downward along the inner side surface of a vehicle cabin, when the airbag is deployed;
   a link strap protruding from the curtain airbag and engaged with the guide rod, wherein an end of the link strap is provided with a ring; and
   a holder for releaseably supporting the ring, wherein an upper portion of the guide rod is received in the holder, and
   wherein the holder supports the ring in a manner such that the ring is not in contact with the guide rod before the airbag is deployed.

7. The guide unit for the curtain airbag according to claim 6, wherein the holder comprises a deformable segment that is configured to be deformed toward the center of the guide rod, and wherein the ring is supported by the deformable segment and is configured to be released from the deformable segment when a downward force, which pulls the ring, exceeds a predetermined value and deforms the deformable segment.

8. A curtain airbag device comprising:
   a curtain airbag that is configured to be deployed downward along an inner side surface of a vehicle cabin; and
   a guide unit according to claim 6 for guiding an end of the curtain airbag.

9. A guide unit for guiding an end of a curtain airbag when the airbag is deployed, the guide unit comprising:
   a guide rod attached to a pillar of a vehicle, wherein the guide rod extends in a vertical direction and is configured to guide the end of a curtain airbag downward along the inner side surface of a vehicle cabin, when the airbag is deployed;
   a link strap protruding from the curtain airbag and engaged with the guide rod, wherein an end of the link strap is provided with a ring; and
   a holder for releaseably supporting the ring, wherein an upper portion of the guide rod is received in the holder,
   wherein the guide rod and the ring are metallic, and wherein at least a section of the holder in contact with the ring is formed of synthetic resin or rubber.

10. A curtain airbag device, comprising:
    a curtain airbag; and
    a guide unit according to claim 9 for guiding an end of the curtain airbag.

* * * * *